United States Patent [19]
Becker et al.

[11] Patent Number: 4,900,101
[45] Date of Patent: Feb. 13, 1990

[54] BRAKE SYSTEM WITH SLIP CONTROL

[76] Inventors: Horst-Peter Becker, Holbeinstrasse 12, 6000 Frankfurt/Main 70; Ruediger Horne, Beckstrasse 7, 6100 Darmstadt, both of Fed. Rep. of Germany

[21] Appl. No.: 117,163

[22] Filed: Nov. 4, 1987

[30] Foreign Application Priority Data

Nov. 11, 1986 [DE] Fed. Rep. of Germany ....... 3638510

[51] Int. Cl.$^4$ ............................ B60T 8/32; B60T 8/44
[52] U.S. Cl. .................................... 303/110; 303/114; 303/116; 303/119
[58] Field of Search ............... 303/119, 116, 114, 113, 303/117, 110, 100, 92; 188/345, 181

[56] References Cited

U.S. PATENT DOCUMENTS

| | | | |
|---|---|---|---|
| 3,771,839 | 11/1973 | Fink | 303/119 X |
| 3,866,983 | 2/1975 | Kondo | 303/119 |
| 4,565,411 | 1/1986 | Seiber | 303/114 X |
| 4,657,315 | 4/1987 | Belart | 303/119 X |
| 4,660,898 | 4/1987 | Steffes | 303/114 |
| 4,685,747 | 8/1987 | Belart et al. | 303/119 X |
| 4,687,259 | 8/1987 | Reinartz et al. | 303/114 |
| 4,703,978 | 11/1987 | Belart et al. | 303/114 X |
| 4,708,405 | 11/1987 | Belart et al. | 303/114 |
| 4,743,075 | 5/1988 | Belart et al. | 303/114 |

FOREIGN PATENT DOCUMENTS

| | | |
|---|---|---|
| 3438401 | 4/1986 | Fed. Rep. of Germany . |
| 3505410 | 8/1986 | Fed. Rep. of Germany . |
| 2158900 | 11/1985 | United Kingdom . |
| 2173559 | 10/1986 | United Kingdom . |

Primary Examiner—Douglas C. Butler

[57] ABSTRACT

A brake system with slip control is disclosed including a master cylinder to which wheel brakes are connected through controllable main valves. An auxiliary-pressure supply system including a hydraulic pump, a regulating and pressure-monitoring valve and a pressure-compensating and pressure-fluid supply reservoir is connected to the wheel brakes through electromagnetically actuatable inlet and outlet valves. The outlet valves are normally closed in their inactive condition with each one pair of wheel brakes communicating directly with one inlet valve and one outlet valve. Wheel sensors and an electronic circuitry determine the wheel rotational behavior and generate electric braking-pressure control signals for operating the inlet and outlet valves. The inlet valves are closed in their inactive condition and are switched to open upon actuation and have their inlet side directly connected with the auxiliary-pressure supply system and their outlet side directly connected with the main valves. Accordingly, there is no need for non-return valves in the pressure-fluid supply line leading to the inlet valves.

1 Claim, 1 Drawing Sheet

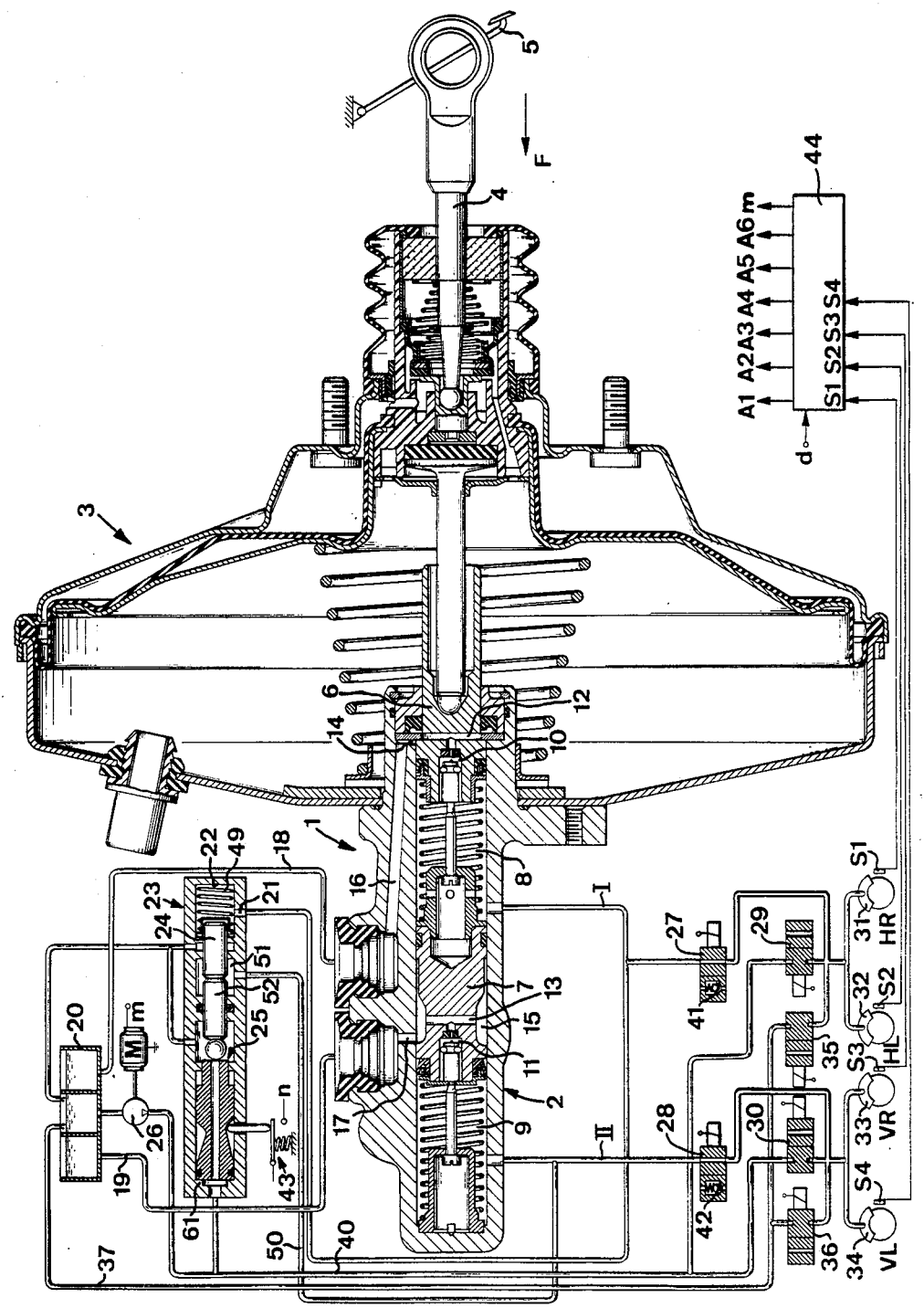

BRAKE SYSTEM WITH SLIP CONTROL

BACKGROUND OF THE INVENTION

The present invention relates to a brake system of the type having slip control and includng a master cylinder to which wheel brakes are connected by way of controllable main valves. These systems also include an auxiliary-pressure supply system having a hydraulic pump, a regulating and pressure-monitoring valve as well as a pressure-compensating and pressure fluid supply reservoir, to which supply system the wheel brakes are connected through electromagnetically actuatable inlet and outlet valves. The outlet valves are closed in their inactive condition and each pair of wheel brakes communicates directly with one inlet valve and one outlet valve. Wheel sensors and an electronic circuitry for determining the wheel rotational behavior and for generating electric braking-pressure control signals for the inlet and outlet valves ar also provided in such systems.

In a known brake system of this type, the master cylinder actuates two brake circuits, to which one pair of the two pair of brakes is respectfully allocated. These two brake circuits are in communication each with one pair of wheel brakes thereof the main valves, which are opened in their unactuated condition, and through the inlet valves, which also assume their opened position when in an unactuated condition. The wheel brakes communicate with the pressure-compensating reservoir through the outlet valves, which are closed in their unactuated position, and a hydraulic return line. Also, the two brake circuits are each connected to the auxiliary-pressure supply system, that is, to the hydraulic pump and to the regulating valve by way of a non-return valve and a connecting line. The non-return valves open as soon as the auxiliary pressure rises by a predetermined minimum value in excess of the pressure instantaneously prevailing in the brake circuits between the inlet valves and the main valves. When the hydraulic pump is switched on, the main valves are simultaneously switched over into a second switch position which allows pressure reduction only in the direction toward the master cylinder and the regulating valve. Accordingly, corresponding non-return valves are connected in parallel to the main valves. The non-return valves may be structurally integrated into the main valves.

SUMMARY OF THE INVENTION

It is an object of the present invention to devise a brake system of this general type wherein the structural complexity in respect to the valves required in such system is reduced.

This object is achieved according to the invention in that the inlet valves are maintained closed in their inactive state and assume their opened position upon actuation, and in that the inlet valves communicate directly with the auxiliary-pressure supply system on their inlet side and communicate directly with the main valves on their outlet side.

Advantageously, the invention obviates the need for non-return valves in the pressure-fluid supply lines between the inlet valves and the auxiliary-pressure supply system.

According to the invention, when normal braking is effected, the pressure fluid delivered by the master cylinder propagates in each brake circuit through one valve only. This provides for a reduction in the throttling effect in the brake circuits and accordingly provides an improvement in pedal feel during normal braking.

BRIEF DESCRIPTION OF THE DRAWING

The drawing is a partial cross-sectional, schematic view of a brake system having slip control according to the invention.

DETAILED DESCRIPTION OF A PREFERRED EMBODIMENT

As shown in the illustrated embodiment, the inventive brake system includes a braking pressure generator 1 comprising a hydraulic unit which is substantially composed of a tandem master cylinder 2 and a vacuum booster 3 connected upstream thereof. The pedal force F applied on a brake pedal 5 is transmitted by a push rod 4 in a known fashion onto the vacuum booster 3 and after being boosted by auxiliary force, onto the working pistons 6 and 7 of the tandem master cylinder 2.

In the shown release position of the brakes, the pressure chambers 8, 9 of the master cylinder 2 are in communication with a pressure-compensating and pressure-fluid supply reservoir 20 through open central valves 10, 11, connecting channels 12, 13 in the interior of the pistons 6, 7, annular chambers 14, 15, connecting bores 16, 17 and hydraulic lines 18, 19.

A first control chamber 22 of a pressure monitoring regulating valve 23 is connected to the pressure chamber 8 through a control input 21. The control pressure is transmitted by pistons 24, 52 in the interior of the regulating valve 23, onto a spherical seat valve 25 which, on the one hand, is connected hydraulically to the pressure side of a hydraulic pump 26 that is driven by an electric motor M and, on the other hand, is connected to the pressure-compensating reservoir 20. The suction side of the pump 26 is likewise in communication with the reservoir 20.

Each of the two brake circuits I, II from the master cylinder 2 directly communicate with two wheel brakes 31, 32; 33, 34 by way of electromagnetically actuatable main valves 27, 28 which are open in their inactive condition. The parallel connected wheel brake pairs 31, 32 and 33, 34, respectively, can either be allocated to the wheels of one axle such as the rear wheels HR, HL, and the front wheels VR, VL, as shown in the drawing or to diagonally located brakes on the vehicle.

The wheel brakes are connected directly to electromagnetically actuatable inlet valves 29, 30 and outlet valves 35, 36 all being closed in their initial position. The valves are two-way/two-position directional control valves.

The inlet valves 29, 30 communicate through a connecting line 40 directly with the hydraulic pump 26 and regulating valve 23 of the auxiliary-pressure supply system. The outlet valves 35, 36 are in direct connection with the pressure-compensating reservoir 20 through a hydraulic return line 37. The main valves 27, 28 can be switched over to assume a second switch position in which pressure reduction only in the direction of the braking pressure generator 1 is possible. For this purpose, corresponding non-return valves 41, 42 are connected in parallel with the main valves 27, 28 or, if desired, can be structurally integrated with the main valves. The valves are designed as electromagnetically actuatable valves, but they may also be actuatable hydraulically.

The vehicle wheels are equipped with inductive sensors $S_1$, $S_2$, $S_3$, $S_4$ which cooperate with a toothed disc co-rotating synchronously to the wheel rotation and which generate electric signals indicative of the wheel rotational behavior, such as the wheel speed and variations thereof. These signals are fed over the inputs $S_1$, $S_2$, $S_3$, $S_4$ to an electronic signal-processing and combining circuitry 44 which generates braking-pressure control signals for temporarily switching over the inlet and outlet valves 29, 30, 35, 36 and the main valves 27, 28 on detection of an imminent locked condition and to thereby keep the braking pressure constant by decreasing and increasing the pressure at the appropriate time. Accordingly, the actuating magnets of the inlet and outlet valves are driven by the outputs $A_1$, $A_2$, $A_3$, $A_4$, and the actuating magnets of the main valves 27, 28 are driven by the outputs $A_5$, $A_6$. The electric connecting lines between the ports $A_1$, $A_2$, $A_3$, $A_4$, $A_5$, $A_6$ and the coils of the valves 27, 28, 29, 30, 34, 35 are not illustrated for the sake of simplicity.

When generating the braking-pressure control signals, the switch condition of a differential-pressure switch 43 which is part of the regulating valve 23, as well as other signals are also evaluated. Signal input d is provided for this purpose. The switch-on signal for starting the drive motor M of the hydraulic pump 26 which runs only during a slip control action is applied to the motor M through the connection m.

The brake system operates as follows:

On brake application, the pedal force F, boosted by the vacuum in the booster 3, is transmitted onto the master cylinder pistons 6, 7. The central valves 10, 11 close, thus allowing braking pressure to develop in the pressure chambers 8, 9 and hence in the brake circuits I, II which propagates by way of the valves 27, 28 to the wheel brakes 31, 32 and 33, 34, respectively.

The pressure in the chamber 8 is also supplied to the control inlet 21 and to the control chamber 22 of the regulating valve 23 and increases the closing force on the seat valve 25 as generated by a regulator spring 49. The brake circuit II, including the pressure chamber 9, communicates by way of a pressure line 50 to a second control chamber 51 into which the two pistons 24, 52 extend, immersing. However, under normal conditions, this remains without effect, since the hydraulic pump 26 is not in operation.

On detection of an imminent locked condition at one or more of the wheels by means of the sensors $S_1$, $S_2$, $S_3$, $S_4$ and the circuitry 44, slip control will commence. The drive motor M of the pump 26 will be switched on, whereby auxiliary pressure develops in the auxiliary-pressure supply system and in the supply line 40 which pressure is proportional to the pressure in the control chambers 22, 51 and/or the pressure chambers 8, 9 and accordingly to the pedal force F.

Simultaneously, response of the circuitry 44 and issuance of signals from the ports $A_5$, $A_6$ results in change-over of the magnetically actuatable main valves 27, 28 and thus causes isolation of the brake circuits I, II by way of the non-return valves 41, 42. As noted above the valves 27, 28 can be actuated hydraulically instead of electromagnetically. Further displacement of the master cylinder pistons 6, 7 in the direction of the pedal force F as well as emptying of the pressure chambers 8, 9 is accordingly precluded. As soon as sufficient pressure is attained, the auxiliary-pressure supply system will perform the function of the braking pressure generator 1 by way of the supply line 40. The pressure fluid flows dynamically through the supply line 40 into the brake circuits I, II in dependence on the actuation of the inlet and outlet valves 29, 30, 35, 36 by the circuitry 44. Accordingly, the actual braking pressure variation in the wheel brakes 31, 32, 33, 34 is determined by the inlet and outlet valves 29, 30, 35, 36 which are supplied with slip-controlling braking pressure control signals over the lines $A_1$, $A_2$, $A_3$, $A_4$.

What is claimed is:

1. A brake system with slip control, comprising a master cylinder, two pair of wheel brakes, each pair connected to a one of two controllable main valves, each said main valve connected to said master cylinder, an auxiliary-pressure supply system including a hydraulic pump connected to a regulating and pressure-monitoring valve, a pressure-compensating and pressure-fluid supply reservoir connected to said pump, said supply system connected to the wheel brake pairs by one inlet and one outlet electromagnetically actuatable valve at each pair of wheel brakes, the outlet valves being closed in an inactive condition, each one pair of wheel brakes communicating directly with one inlet valve and one outlet valve, wheel sensor means and electronic circuitry means for determining wheel rotational behavior and for detecting brake slip and for generating electric braking-pressure control signals for operating the inlet and outlet valves solely during brake slip control, each inlet valve being closed in an inactive condition and operable to assume an opened position upon actuation, an inlet side of each inlet valve communicates directly with the auxiliary-pressure supply system and an outlet side of each inlet valve communicates directly with a respective one of the main valves and wherein during brake slip control said electronic circuitry means closes said main valves to isolate said wheel brakes from said master cylinder and wherein slip control braking pressure variation in said wheel brakes is solely controlled by actuation of said inlet and outlet valves.

* * * * *

UNITED STATES PATENT AND TRADEMARK OFFICE
CERTIFICATE OF CORRECTION

PATENT NO. : 4,900,101

DATED : February 13,1990

INVENTOR(S) : Horst-Peter Becker

It is certified that error appears in the above-identified patent and that said Letters Patent is hereby corrected as shown below:

On Title Page:

Item [73], Assignee insert --Alfred Teves GMBH Federal Repubic of Germany--.

Signed and Sealed this

Twenty-seventh Day of August, 1991

*Attest:*

HARRY F. MANBECK, JR.

*Attesting Officer*     *Commissioner of Patents and Trademarks*